May 4, 1948.  A. DELAPLACE  2,441,111
COMBINED ELECTRIC MOTOR AND SPEED REDUCER UNIT
Filed Feb. 18, 1938
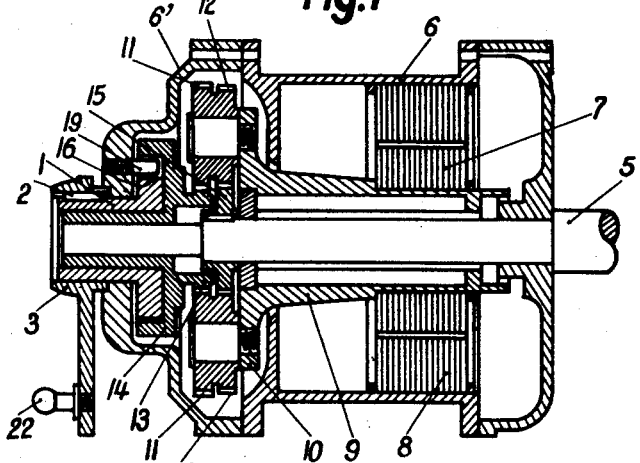
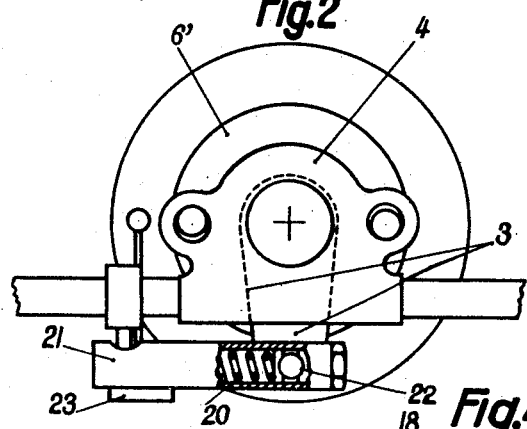
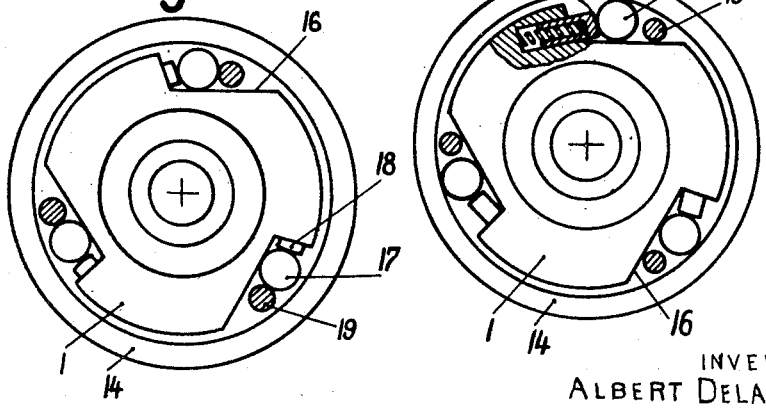
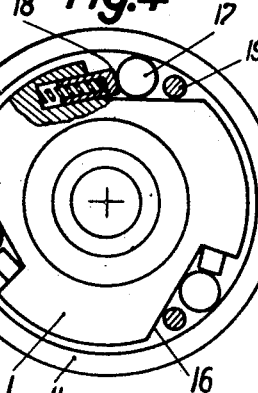
INVENTOR
ALBERT DELAPLACE
BY
Victor D. Borst
ATTORNEY Patented May 4, 1948

UNITED STATES PATENT OFFICE 2,441,111

COMBINED ELECTRIC MOTOR AND SPEED REDUCER UNIT

Albert Delaplace, Roubaix, France; vested in the Attorney General of the United States Application February 18, 1938, Serial No. 191,142
In France March 3, 1937

Section 3, Public Law 690, August 8, 1946
Patent expires March 3, 1957

5 Claims. (Cl. 74—306)

The invention relates to units which are used for the direct drive of weaving looms, or other machines and which combine in a single unit; an electric motor, a speed reducer having a sun and planet gear train, and means for enabling the motor to reach the desired speed before effecting the coupling of the speed reducer with the shaft to be driven.

The invention has for its object a combined electric motor and speed reducer of this type, which is mainly characterised by the fact that:

1. The locking of the main pinion of the sun and planet speed reducing gearing a certain time after the motor has been started, is obtained by means of wedging members interposed between a fixed sleeve having inclines and a drum carrying the toothing which forms the main pinion, and in that the position of said wedging members is controlled by elements which are subjected to the oscillations of the stator which is rotatably mounted about the axis of the combined motor and speed reducer unit and oscillates under the effect of the reaction of the torque it communicates to the rotor.

2. In the event of an abnormal or an accidental overload, the wedging members are instantaneously and automatically brought back to the neutral position, releasing the main pinion of the speed reducer and thereby separating the motor from the driven machine, through the instrumentality of a spring or equivalent device which is interposed between a part secured to the sleeve having inclines and the supporting frame of the whole apparatus.

3. The mounting of the main pinion of the speed reducer relatively to the fixed sleeve, through the intermediary of the releasable wedging members, enables the power impulse periods of the driven machines such, in particular, as weaving looms, to be integrally recuperated.

In order to enable the invention to be better understood, an embodiment of a combined electric motor and speed reducing unit constructed according to the invention is described hereinafter and diagrammatically illustrated, merely by way of a non-limitative example, in the accompanying drawings in which:

Fig. 1 is a view of the unit in longitudinal section;

Fig. 2 is an end view of same; and

Figs. 3 and 4 are detail views showing, in two different positions, the wedging members co-operating with the fixed sleeve having inclines.

In these figures, 1 is a fixed sleeve which is secured, by means of a key 2 for example, to a bushing 3 which can effect certain angular movements relatively to a support 4 forming part of a frame which is fixed to the ground, or again to the machine to be actuated.

The sleeve 1 serves as a bearing for the driven shaft 5, concentrically with which is mounted the case 6 of the motor of which 7 is the rotor and 8 the stator which is secured to the case 6 and can effect with the latter oscillations of limited amplitude about the common axis of the shaft 5 and of the sleeve 1.

Concentrically with the shaft 5 is mounted a tubular part 9 which can rotate freely about said shaft and on which is fixed the rotor 7; said part 9 is terminated by a plate 10 carrying pairs of coupled planet gears 11, 12 which are loosely mounted on the journals which support them, the gears 11 meshing with a toothing 13, or main gear of the reducer, which is carried by an extension of a drum 14 of which the central hub is freely mounted inside the sleeve 1, whereas the planet gears 12 mesh with a gear 15 keyed on the shaft 5; the number of teeth of the gear 11 being equal to that of the teeth of the gear 12, or differing therefrom by one, two or more units.

According to the invention, the fixed sleeve 1 has inclines 16 formed on its outer surface; in the spaces left between said inclines and the inner wall of the drum 14 are arranged wedging rollers 17 which are subjected to the action of resilient push rods 18 and the position of which is controlled by fingers 19 secured to the case 6'. The whole arrangement is constructed in such a manner that when inoperative (Fig. 3) the fingers 19 push back the rollers 17 so as to hold them away from the wall of the drum 14, so that the latter can rotate freely.

The device operates as follows:

When the current is sent into the motor, the rotor 7 rotates the plate 10 and, owing to the fact that the gear 15 remains fixed due to the resistance offered by the machine to be driven, the planet gears 11 by means of the toothing 13 drive the drum 14 which rotates freely owing to the fact that the rollers 17 are in the position shown in Fig. 3.

But this condition lasts a very short instant since, under the influence of the reaction of the torque it communicates to the rotor 7, the stator 8 rotates through a certain angle and thereby rotates the case 6—6' and the fingers 19 which move away from the rollers 17; these latter being thus released, are pushed back by the resilient push rods 18 which wedge them between the inclines 16 and the drum 14 (Fig. 4). As the toothing 13 is thus abruptly locked, the planet gears 11 bear on same and the planet gears 12 drive the gear 15 and the shaft 5 at the suitable speed (since the motor has then reached a speed corresponding to the desired speed).

When the motor stops, the case 6—6' returns to its inoperative position under the action of a counterweight 23, the fingers 19 bring the rollers 17 back to the neutral position, that is to say to the unwedged position; the combined motor and speed reducer unit is thus uncoupled from the weaving loom or other machine.

During operation, in the event of an abnormal overload, the bushing 3 which is keyed on the sleeve 1 effects a certain angular movement relatively to the fixed support 4; it thereby compresses a spring 20 which is lodged in a fixed housing 21 and on which it acts through the intermediary of a head 22, said spring 20, the strength of which is suitably chosen according to the use intended, forming the member on which bears the main gear of the speed reducer. The inclines 16 of the sleeve 1 and the drum 14 then exert an equal pressure on the rollers 17, but the difference of the radii of these two parts compels the inclines 16 to move forwards faster than the drum 14, this being effected by means of the bearing spring 20 of the bushing 3, and to cause the unwedging of the rollers 17, thereby releasing the drum 14 and producing the stoppage of the machine to be driven; the stator 8 returns to its initial position under the influence of the counterweight 23.

It should furthermore be noted that owing to the way the drum 14, is mounted, the device permits of the recuperation of the "power impulse periods" which occur, for example, in the case of weaving looms, at the instant when the reed has just beaten up the pick against the fell of the cloth and the slay receives from the cloth a "return impact" which causes an increase in the speed of said slay during its return movement. In fact, the motor and speed reducer unit enables the loom to accelerate its speed freely when the power impulses occur, owing to the fact that the increase of speed of the gear 15 can be effected through the free-wheel mounting of the drum 14 carrying the gear 13.

Of course, without exceeding the scope of the invention, modifications and improvements of details could be imagined, and also the use of equivalent means could be considered.

What I claim as my invention is:

1. A device of the character described including a housing pivotally mounted on a support for oscillation about its pivotal axis, a shaft journaled in said housing, a motor within said housing having the motor-hub rotatably mounted on said shaft, planet gears rotatably mounted on said hub, a gear fixed to said shaft and connected in train to the planet gears; a member rotatably mounted on said shaft and including gear teeth also connected in train to said planet gears whereby the rotation of the motor hub will rotate said member, and means operable by the oscillation of said housing for arresting the rotation of the member about said shaft during the rotation of said motor-hub to effect rotation of said shaft by said planet gears connected thereto in train.

2. A device of the character described including a housing pivotally mounted on a support for oscillation about its pivotal axis, a shaft journaled in said housing, a motor within said housing comprising a hub rotatably mounted on the shaft, a stator fixed to the casing and a rotor fixed to the hub whereby the torque effective from the initial rotation of the rotor relative to the stator will cause oscillation of the housing about its pivot, planet gears rotatably mounted on said hub, a member rotatably mounted on said shaft and connected in train to said planet gears whereby the rotation of the hub will rotate said member, and means operable by the oscillation of said housing for arresting the rotation of the member about said shaft during the rotation of said hub to effect rotation of said shaft by said planet gears connected thereto in train.

3. In a device of the character described including an angularly oscillatable housing, a shaft for operating a load journaled in said housing, a motor within said housing comprising a hub rotatably mounted on the shaft, a stator fixed to said housing and a rotor fixed to the hub, a speed reducing mechanism interposed between said rotor and said load operating shaft including a plurality of pinions of different pitch lines rotatably mounted on said hub for rotation in an orbit about the axis of the load operating shaft, a gear fixed to said load operating shaft and connected in train to one of said pinions of a lesser pitch line, a member rotatably mounted on said load operating shaft having a pinion integral therewith and connected in train to one of said pinions of a greater pitch line whereby the rotation of the rotor will rotate said member freely about said load operating shaft, means carried by the housing and controlled by the oscillation thereof for arresting the rotation of said member during the rotation of the rotor to effect the transmission of said rotor rotation through the pinion of lesser pitch line to said load operating shaft whereby said shaft will rotate at an angular velocity less than the angular velocity of said rotor.

4. In a device of the character described having a housing pivotally mounted on a supporting axis for oscillation thereabout, a shaft journaled in said housing adapted to operate a load, a motor in said housing having a hub rotatably mounted on the shaft, a stator fixed to said housing and a rotor fixed to the hub whereby the reaction of the starting torque between the stator and the rotor effective upon the initial rotation of the rotor will cause the housing to oscillate, a member rotatably mounted on said shaft, means operable by said rotor for rotating said member and said shaft, said means being effective to rotate said shaft only when the rotation of said member is arrested, means operable by the oscillation of said housing for arresting the rotation of said member to effect the rotation of said shaft by said rotor, and means operable by an excessive load applied to said shaft for inhibiting the operation of said last named means to resume rotation of said member and to arrest rotation of said shaft.

5. The invention as set forth in claim 4 in which force weighing means are provided for controlling the excess load operated means.

ALBERT DELAPLACE.

REFERENCES CITED

The following references are of record in the file of this patent:

UNITED STATES PATENTS

| Number | Name | Date |
|---|---|---|
| 437,067 | Whiton | Sept. 23, 1890 |
| 613,894 | Sherrin | Nov. 18, 1898 |
| 1,118,616 | Apple | Nov. 24, 1914 |
| 1,826,172 | Greenwald | Oct. 6, 1931 |
| 1,981,789 | Gerard | Nov. 20, 1934 |